UNITED STATES PATENT OFFICE.

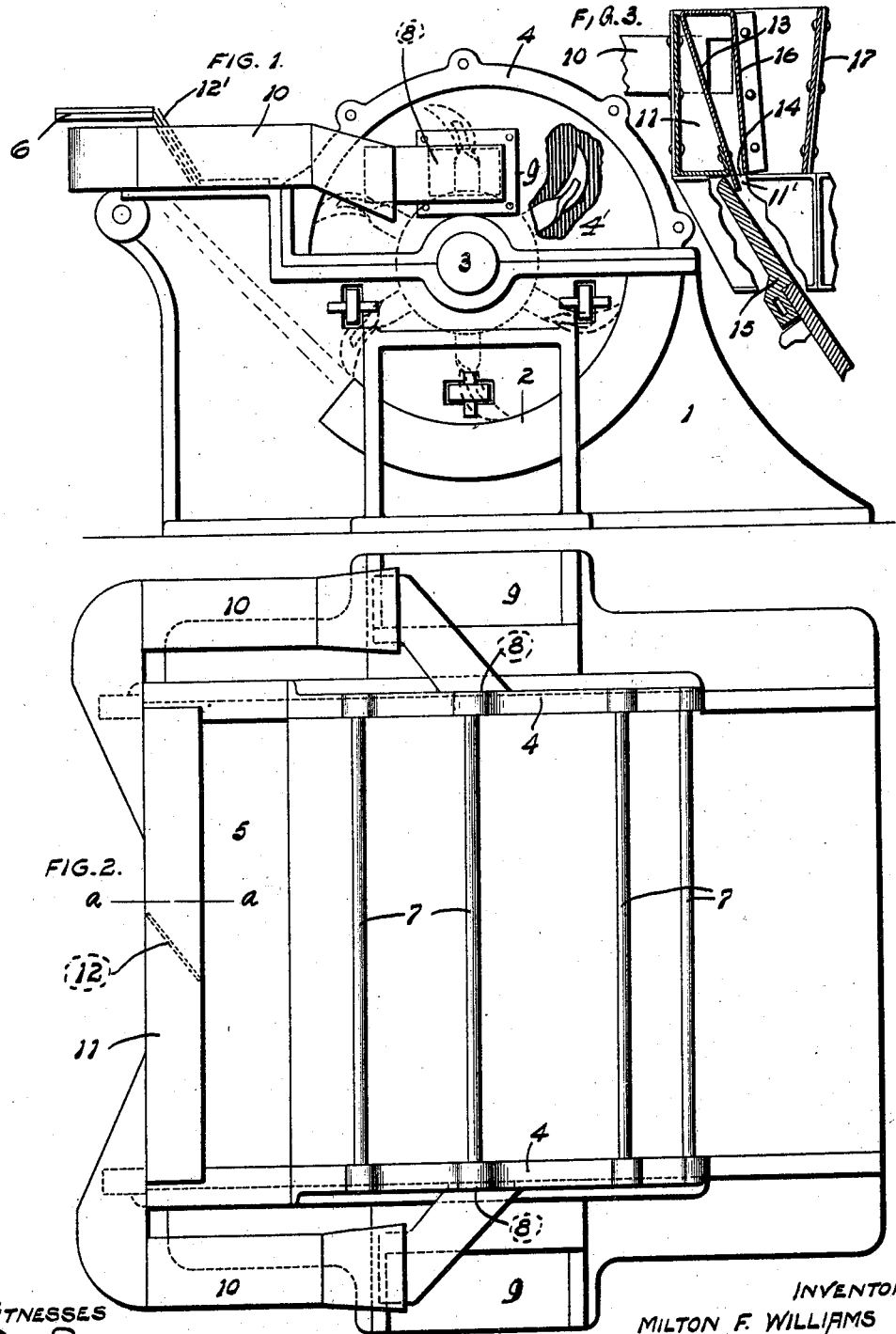

MILTON F. WILLIAMS, OF ST. LOUIS, MISSOURI, ASSIGNOR TO WILLIAMS PATENT CRUSHER AND PULVERIZER COMPANY, OF ST. LOUIS, MISSOURI, A CORPORATION OF MISSOURI.

DUST-DEFLECTOR FOR PULVERIZER-MACHINES.

1,014,193.  Specification of Letters Patent.  Patented Jan. 9, 1912.

Application filed October 1, 1910. Serial No. 584,865.

*To all whom it may concern:*

Be it known that I, MILTON F. WILLIAMS, a citizen of the United States, residing at St. Louis, Missouri, have invented a certain new and useful Improvement in Dust-Deflectors for Pulverizer-Machines, of which the following is a full, clear, and exact description, such as will enable others skilled in the art to which it appertains to make and use the same, reference being had to the accompanying drawings, forming part of this specification, in which—

Figure 1 is a general elevational view of my improved device as applied to a well-known form of crusher and pulverizer. Fig. 2 is a plan view of the machine shown in Fig. 1. Fig. 3 is a fragmentary sectional view taken on the line *a—a* of Fig. 2 showing a slight modification.

My invention relates to an improvement in a dust deflector which is especially adapted to be used in connection with a crusher and pulverizer of a well-known form.

The object of my invention is to provide a simple structure to collect the dust and fine particles thrown off from a rotary pulverizing machine and have this material drawn back into substantially the center of the cage due to the suction produced at this point.

Referring to the drawings, 1 indicates the casing for the machine having a suitable grinding surface, 2, mounted thereon.

3 is a shaft journaled in the upper part of the casing 1 upon which are mounted the rotary hammers or shredders of the pulverizing mechanism. These elements are incased by a cast piece 4 and casing 1, which cast pieces together form a casing or cage.

The casing 1 is provided at one side with an opening 5 in which the material to be acted upon is passed from a suitable hopper mounted on a support 6. The sides 4' of the upper casting 4 are connected together by a series of cross rods 7. In the sides 4', above the shaft 3, are cut openings 8 over which a cast bracket with chute connection 9 is attached. Coöperating with the end of the chute 9 is an additional chute section 10 with flaring ends embracing the end of the chute 9 and extending at its opposite end around to one side of the machine to connect with a hopper 11 extending across the machine between the ends of the extensions 10. This hopper 11 is provided with a baffle plate 12 half-way of its length, extending diagonally thereacross. The bottom of the hopper 11 is formed with an opening 11' communicating with the interior of the casing 1, and extending over this opening and connected with the support 6, is a guard plate 12', so that material introduced from the hopper on the support 6 may pass down over the guard plate and within the casing to the cage proper without being drawn directly into the dust collector hopper 11.

As shown in Fig. 3, the hopper 11 is composed of sheet metal with suitable stiffening pieces and is divided into two triangular sections by means of a plate 13. Between the plate 13 and the wall of the hopper 11 there is formed a narrow opening 14, connecting with the breaker surface 15 of the crushing device. In front of the wall 16 of the hopper 11 is a partition 17 forming, between the wall 16 and the partition 17, a chute connection from the supply hopper mounted on the support 6 above the dust collector 11.

In operation, as the hammers or shredders rotate within the cage of the pulverizer the dust and fine particles are thrown off and drift out through the opening in the casing 1, under the dust collector 11 into which they are drawn and afterward carried by means of the branch pipes or chute connections 10 back into the cage through the oppositely arranged openings 8 near the center of the rotating hammers by the suction produced at this point. The baffle plate 12 is provided in order that there will be no interference between the particles drawn up through the center of the opening 5 in the casing 1, but this matter will be divided into two parts one passing to the left and the other to the right of said plate and through the oppositely arranged chute sections 10 to the openings 8 in the top casting 4 near the center of the rotating hammers or shredders.

The form shown in Fig. 3 provides a narrow opening at 14 tending to increase the draft in the dust collector as it is shaped to create a better draft current than with the square section which results by the omission of the diagonal plate 13.

I am aware that minor changes may be made in the construction, arrangement and combination of the various parts of my device without departing from the spirit of my invention, the scope of which is indicated in the accompanying claims.

I claim:—

1. In a crushing and pulverizing device, rotating hammers, a casing surrounding and supporting said hammers, having a feed opening formed therein, a dust hopper mounted directly over a portion of said opening and communicating with the interior of said casing and chutes extending from each side of the hopper and connected at substantially the center of rotation of the hammers to the casing.

2. In a grinding and pulverizing device, rotating hammers, a casing surrounding said hammers and having a feed opening at one side thereof a dust hopper positioned directly over a portion of said opening and extending across the machine, a baffle plate mounted therein and chutes extending from the hopper on each side of the baffle plate and connected to the opposite side walls of the casing in proximity to the rotating hammers.

3. In a crushing and pulverizing device, rotating hammers, a casing supporting and surrounding said hammers, having a feed opening at the top, a supply hopper communicating with said opening, a dust hopper also communicating with said opening and with the interior of said casing, and chutes connecting the dust hopper with openings in the casing in proximity to the rotating hammers.

4. In a crushing and pulverizing device having rotating hammers, a casing supporting and surrounding said hammers, having an opening at the top, a supply hopper directly communicating with said opening through a restricted passageway, a dust hopper also communicating directly with said opening, and chute sections from the dust hopper to the sides of the casing in proximity to the rotating hammers.

5. In a crushing and pulverizing device having rotating hammers, a casing surrounding said hammers with an opening at the top, a dust-collecting hopper communicating directly with said opening, cast brackets attached to either side of the casing registering with openings therein, and chute connections between each cast bracket and opposite sides of the dust hopper.

In testimony whereof I hereunto affix my signature in the presence of two witnesses, this 14th day of September, 1910.

MILTON F. WILLIAMS.

Witnesses:
F. R. CORNWALL,
M. P. SMITH.